(12) United States Patent
Brunard

(10) Patent No.: US 10,322,681 B2
(45) Date of Patent: Jun. 18, 2019

(54) SUPPORT FOR A DEVICE, SUCH AS A SMARTPHONE

(71) Applicant: FAURECIA INTERIEUR INDUSTRIE, Nanterre (FR)

(72) Inventor: Christophe Brunard, Bois Colombes (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 222 days.

(21) Appl. No.: 15/267,091

(22) Filed: Sep. 15, 2016

(65) Prior Publication Data

US 2017/0072873 A1 Mar. 16, 2017

(30) Foreign Application Priority Data

Sep. 16, 2015 (FR) .................................... 15 58684

(51) Int. Cl.
*B60R 11/02* (2006.01)
*B60K 37/04* (2006.01)
(Continued)

(52) U.S. Cl.
CPC .......... *B60R 11/0241* (2013.01); *B60K 37/04* (2013.01); *H04M 1/04* (2013.01); *B60K 2350/00* (2013.01); *B60K 2350/405* (2013.01); *B60K 2350/406* (2013.01); *B60K 2350/941* (2013.01); *B60K 2350/945* (2013.01); *B60K 2350/946* (2013.01); *B60K 2350/948* (2013.01); *B60R 2011/0005* (2013.01); *B60R 2011/0007* (2013.01); *B60R 2011/008* (2013.01); *B60R 2011/0064* (2013.01); *B60R 2011/0075* (2013.01); *B60R 2011/0082* (2013.01); *B60R 2011/0294* (2013.01)

(58) Field of Classification Search
CPC ... B60R 11/0241; B60R 7/06; B60R 11/0258; B60K 37/04; H04M 1/04
USPC ........................................................ 296/37.12
See application file for complete search history.

(56) References Cited

U.S. PATENT DOCUMENTS 8,910,990 B1 * 12/2014 Oldani .................... B60R 11/02
220/260
9,103,487 B2 8/2015 Hale et al.
(Continued)

FOREIGN PATENT DOCUMENTS

DE 102011053607 A1 3/2013
EP 2810808 A1 12/2014
(Continued)

OTHER PUBLICATIONS

French Search Report in French for application No. FR1558684, dated Jul. 7, 2016, 2 pages.

*Primary Examiner* — Joseph D. Pape
(74) *Attorney, Agent, or Firm* — Reising Ethington P.C.

(57) ABSTRACT

A support for receiving and holding a device, such as a smart phone, in a vehicle. The support includes a first jaw, able to receive a first edge of the device, and a second jaw, able to receive a second edge of the device. The support also includes a sheath and an arm, the arm being able to translate relative to the sheath. The arm includes two segments, articulated to one another using a rotation axis such that the distal segment is urged to rotate relative to the proximal segment in the direction bringing the second jaw closer to the first jaw.

11 Claims, 3 Drawing Sheets

(51) Int. Cl.
*H04M 1/04* (2006.01)
*B60R 11/00* (2006.01)

(56) References Cited

U.S. PATENT DOCUMENTS

| | | | |
|---|---|---|---|
| 9,233,649 B2 | 1/2016 | Bisceglia et al. | |
| 9,434,319 B2 * | 9/2016 | Oldani | B60R 11/02 |
| 2011/0259789 A1 * | 10/2011 | Fan | B60R 11/0258 |
| | | | 206/701 |
| 2016/0193968 A1 * | 7/2016 | Oldani | B60R 11/02 |
| | | | 296/37.12 |

FOREIGN PATENT DOCUMENTS

| | | |
|---|---|---|
| FR | 2964070 A1 | 3/2012 |
| WO | WO2013148531 A2 | 10/2013 |

* cited by examiner

SUPPORT FOR A DEVICE, SUCH AS A SMARTPHONE

TECHNICAL FIELD

The present invention relates to a support for receiving and holding a device, such as a smart phone, in a moving environment, such as a motor vehicle.

BACKGROUND

The problem that arises is supporting such a device, with a substantially parallelepiped shape, in a vehicle, near a driver's cab, advantageously at a dashboard. Such a support must be able to allow the placement of the device quickly and easily, as well as its removal, when the owner of the device so wishes.

Such a support advantageously therefore comprises at least one movement and/or deformation latitude, so as to be able to go from at least one "open" position, in which the device can be placed or removed, to at least one "closed" position, in which the device is immobilized in the support.

Different types of received devices exist, and their dimensions vary from one type to another. Consequently, a support also advantageously comprises at least one movement and/or deformation latitude, potentially combined with the previous one, so as to be able to receive a device, irrespective of its dimensions, from the smallest to the largest. Recent devices, such as smartphones or tablets, can be used in a portrait or landscape orientation. Here, these two orientations may be considered to be two different dimensions.

In the field of device supports, several configurations are known. Thus, for example, one type of support uses a relative translation movement bringing two jaws, substantially parallel to one another, selectively closer together or further apart, so as to open/close the support and simultaneously adapt the distance between the two jaws to a dimension of the device. One example of such a support is described by DE 1020111090056.

Such a configuration has a major drawback inasmuch as it leads to a significant height and therefore a significant volume occupied on the dashboard, the translation axis being arranged substantially vertically.

Another type of support uses a rotational movement. Such a support comprises a first jaw able to receive a first edge of the device, a second jaw able to receive a second edge of the device opposite the first edge and facing the first jaw, and a rotating arm comprising, at its distal end, the second jaw. Thus, a rotation of the arm makes it possible to adjust the distance between the two jaws, both to open/close the support and to adapt it to a dimension of the device, here the distance between the two opposite edges. The two jaws and the arm form a clamp able to grip a device by two opposite edges. One example of such a support is described by EP 2,271,516.

One drawback of such a configuration is that the incline of the device in place in the support depends on its dimension, which determines the distance between the jaws. Furthermore, the distance amplitude between the two jaws remains limited, relative to a given arm length.

SUMMARY

The invention proposes a receiving and holding support, according to a type improving the type using translation, not having the drawbacks of the prior art, and making it possible to receive a wide dimensional range in order to accommodate many types of device.

The invention relates to a support for a device with a substantially parallelepiped shape, such as a smartphone, comprising: a first jaw, extending primarily along a first receiving axis and able to receive a first edge of the device, a second jaw, extending primarily along a second receiving axis substantially parallel to the first receiving axis, able to receive a second edge of the device opposite the first edge, and facing the first jaw, also comprising a sheath, an arm, and a first return means, the sheath being stationary relative to the first jaw, and the arm being able to translate relative to the sheath along the main elongation direction of the arm, and the arm comprising a proximal segment and a distal segment, articulated to one another using a rotation axis secant to the main elongation direction of the arm, the distal segment bearing the second jaw at its distal end, and the first return means tending to rotate the distal segment relative to the proximal segment, in the direction bringing the second jaw closer to the first jaw.

According to another feature, the sheath prohibits any rotation around the rotation axis as long as the rotation axis is in the sheath.

According to another feature, the support also comprises a second return means, tending to move the arm in the sheath.

According to another feature, the second return means is configured so as to cause the arm to leave the sheath.

According to another feature, the rotation axis is substantially perpendicular to the main elongation direction.

According to another feature, the rotation axis is substantially parallel to the first receiving axis.

According to another feature, the support further comprises a locking means, able to immobilize the arm relative to the sheath, substantially in any achievable position.

According to another feature, the locking means comprises a third return means tending to actuate the locking means.

According to another feature, the locking means further comprises an inhibiting means, able to inhibit the locking means when the inhibiting means is activated, and a maneuvering member making it possible to activate the inhibiting means.

According to another feature, the maneuvering member is positioned at the distal end of the distal segment of the arm.

According to another feature, the maneuvering member is positioned on the sheath.

According to another feature, a jaw comprises at least one cavity.

The invention also relates to a dashboard comprising such a support, where the first jaw is stationary relative to the dashboard, preferably horizontal, also preferably aligned with the transverse axis of the dashboard, and where the rotation axis is preferably horizontal, also preferably aligned with the transverse axis of the dashboard.

According to another feature, the first jaw is lower and the second jaw is upper.

According to another feature, the sheath is flush with the dashboard, so that the arm is retractable in the dashboard.

According to another feature, the arm is configured and arranged such that, retracted, at least part of the distal end, preferably the part optionally comprising the maneuvering member, protrudes relative to the dashboard, so as to allow grasping and maneuvering.

The invention also relates to a vehicle comprising such a support or dashboard.

BRIEF DESCRIPTION OF THE DRAWINGS

Other features, details and advantages of the invention will emerge more clearly from the detailed description below, provided for information in relation to the drawings, in which:

FIG. 1 shows the support with the arm retracted in the absence of a device, FIG. 2 shows the support with the distal segment of the arm deployed in the absence of a device, FIG. 3 shows the support with the distal segment of the arm deployed and receiving a device along a small dimension, here are a smartphone with a landscape orientation, FIGS. 4 and 5 show a detail of the support comprising the sheath and the arm, wherein FIG. 4 shows the arm retracted and FIG. 5 shows the distal segment of the arm deployed so as to free the rotation axis.

DETAILED DESCRIPTION

Figure 1:
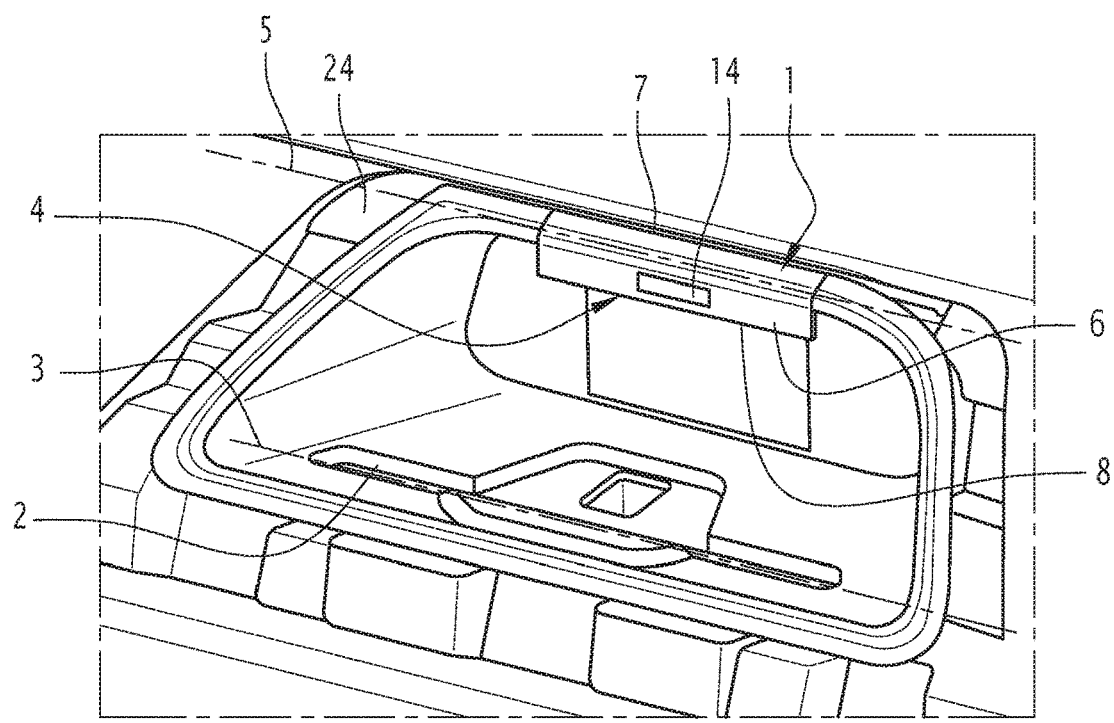
FIGS. 1 to 3 show, in a substantially front perspective view, a support according to one preferred embodiment of the invention.

The invention relates to a support 1 able to receive a device 30 and maintain it in terms of position and orientation. In this document, a device 30 refers to any piece of equipment that a user may wish to immobilize in a vehicle. Such a device 30 typically allows at least one of the following functions: communication and/or assistance in driving the vehicle. Such a device 30 may non-restrictively be: a smart phone, including a cellular telephone of the smartphone type, an older generation cellular telephone, a PDA, a tablet, a phablet, or a GPS receiver. It should be noted that a device 30 here may be generalized to an electronic device, such as a notebook including a route to be followed, navigational information, a road book or a drawn or printed map.

Additionally, herein, a device 30 is substantially parallelepiped. Its weight typically does not exceed several hundred grams. It typically comprises a front panel 33, displaying the information. For the large majority of devices 30, this is the face comprising the screen. A rear face is opposite the front panel 33. The other four faces are called edges 31, 32. The front panel 33 is substantially rectangular. The edges 31, 32 are paired and opposite in pairs. The thickness, measured perpendicular to the front panel 33, is typically smaller than the other dimensions, not exceeding several millimeters, and at most 25 mm. The other dimensions, width and length, may be highly variable within a range typically comprised between 30 mm and 300 mm.

The support and immobilization of the device 30 must be such that they allow the user to continue to use the functions of the device 30. To that end, the front panel 33, typically comprising the display means, must remain visible. In order to be able to be controlled, the device 30 must still remain accessible, at least for its control members, able to be positioned on the front panel 33, for example in the case of a touchscreen, but also on any one of the other five faces. The immobilization must be provided with a certain force in order to withstand the forces exerted by the user on the control members of the device 30. In order to more particularly allow voice communication or voice command functions, the support should also provide audio access to the device, both as input (microphone) and output (speaker).

The user's position generally being fixed, an adjustment to the incline β of the device 30 is advantageous for the user to be able to have a line of sight substantially perpendicular to the front panel 33.

In everyday language, the term "orientation" refers to all of the rotations that a device 30 may undergo. In order to specify and distinguish two rotations of different natures in light of the problem posed, two different terms are used herein according to reduced assertions. The term "orientation" is preferably used to define the angular position of the device 30 relative to a rotation axis normal to the front panel 33. Two particular orientations may then be noted: portrait and landscape. The term "incline" is preferably used to define the angular position of the device 30 relative to a rotation axis coplanar to said front panel 33. The incline is typically an adjustment making it possible to orient the device 30 relative to the viewing direction of the user. Conversely, a change in orientation does not change the line of sight.

Figure 2:
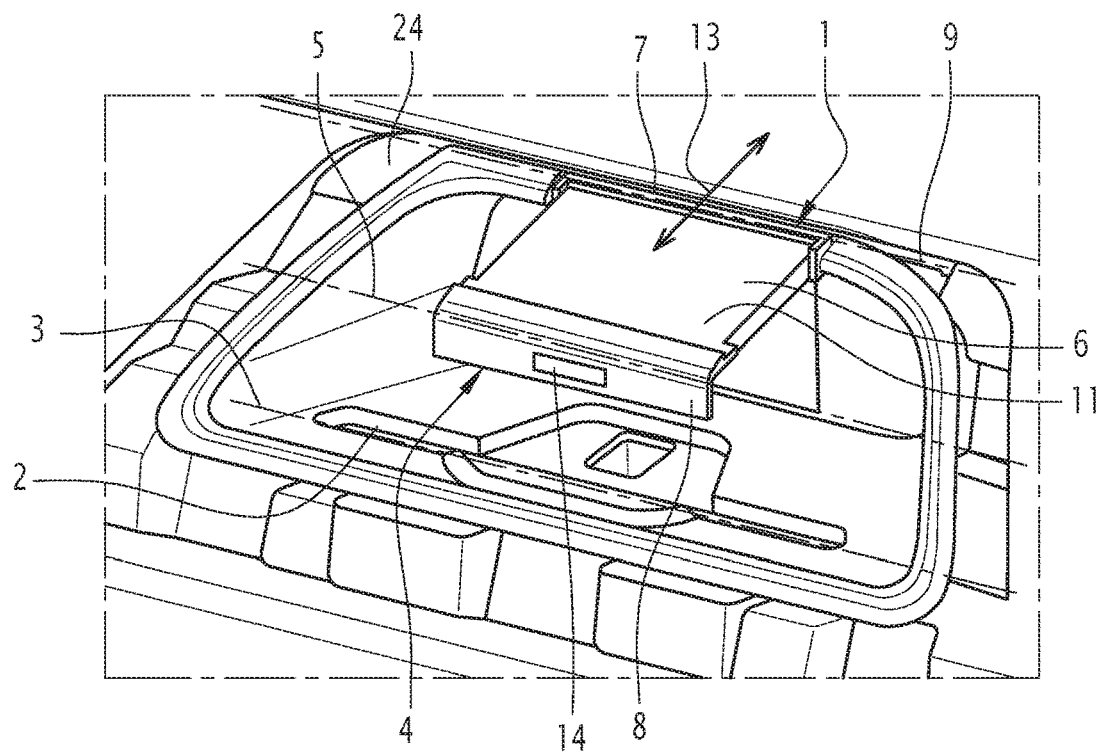
Figure 3:
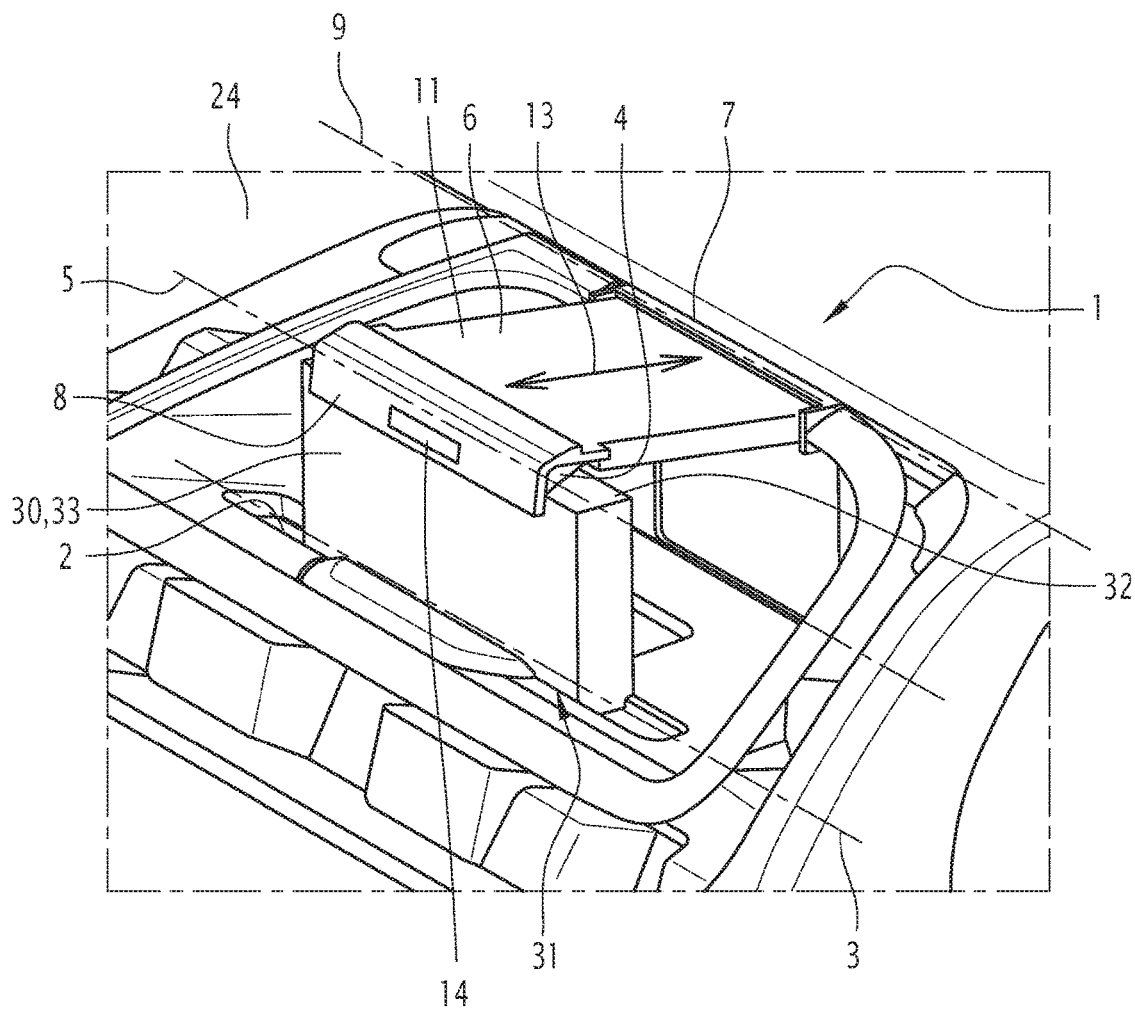
Figure 4:
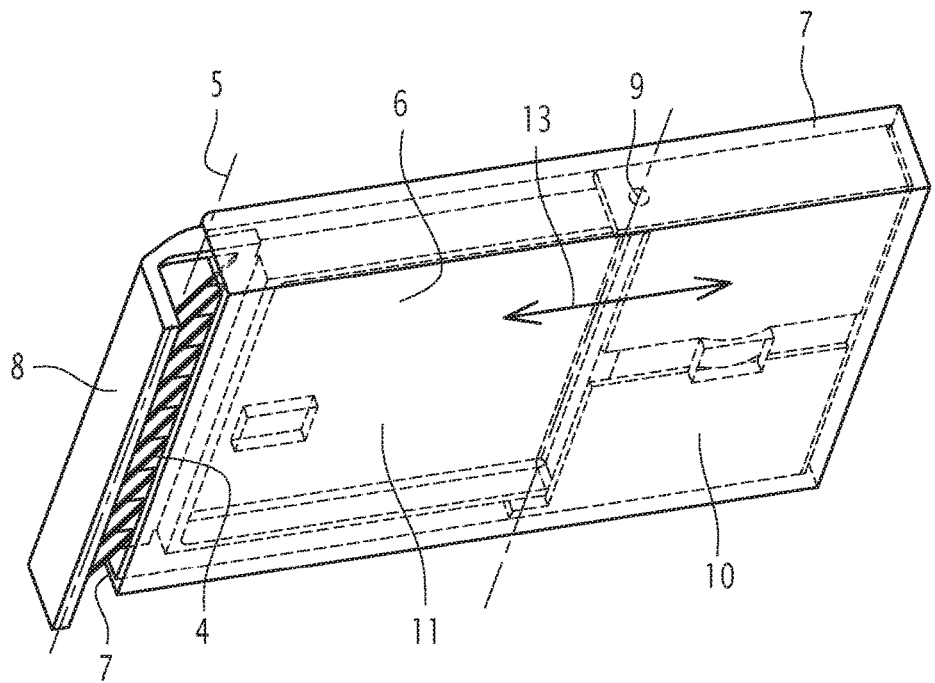
Figure 5:
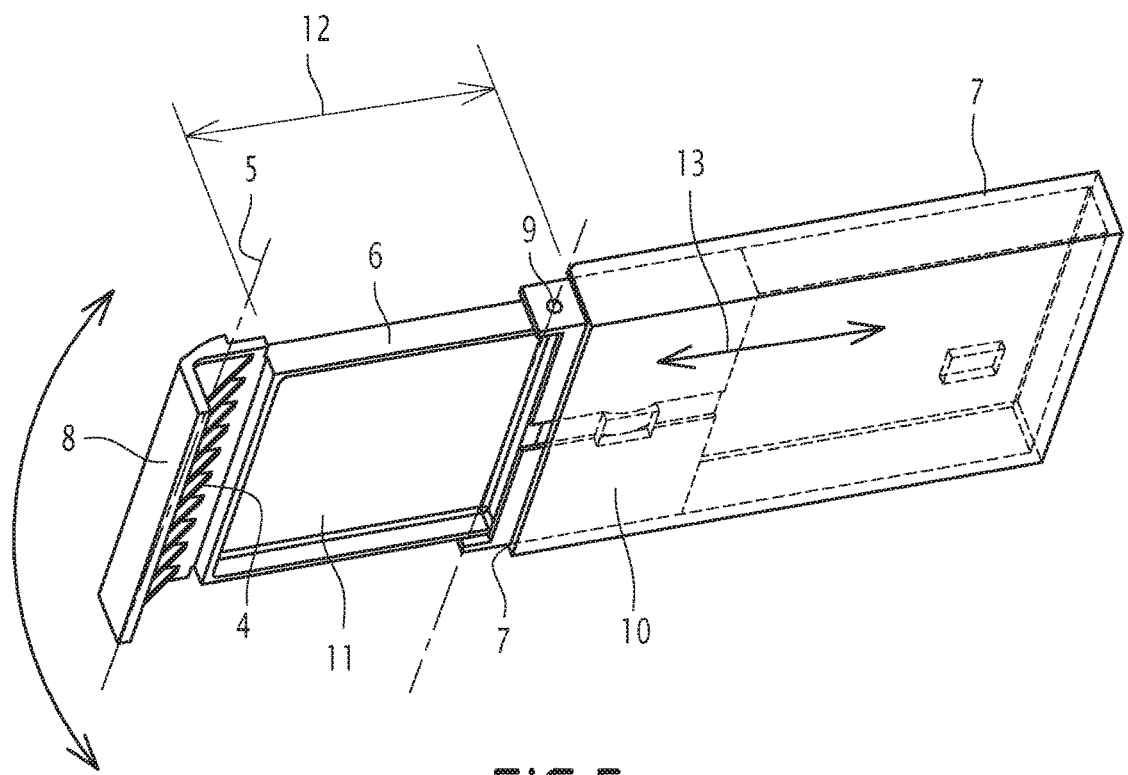

As illustrated in FIGS. 1-3, a support 1 for such a device 30 comprises a first jaw 2, a second jaw 4. The first jaw 2 is able to receive a first edge 31 of the device 30 when said first edge 31 and the first jaw 2 come into contact. The first jaw 2 has a main extension along a first receiving axis 3. The second jaw 4 is able to receive a second edge 32 of the device 30, opposite the first edge 31 when said second edge 32 and the second jaw 4 come into contact. The second jaw 4 has a main extension along a second receiving axis 5. This second receiving axis 5 is substantially parallel to the first receiving axis 3, at least in the maintenance position when the device 30 is in place in the support 1. This second jaw 4 is across from the first jaw 2, at least in the maintenance position when the device 30 is in place in the support 1.

The support 1 also comprises a sheath 7 and an arm 6. The sheath 7 is typically arranged such that its opening emerges at the outer surface of the dashboard 24, in a direction secant to the outer surface of the dashboard 24. The arm 6 is able to translate relative to the sheath 7, along the main elongation direction 13 of the arm 6. The sheath 7 is stationary relative to one of the jaws, such as the first jaw 2. The arm 6 bears, at its distal end 8, the other jaw, such as the second jaw 4.

The translational movement of the arm 6 relative to the sheath advantageously makes it possible to deploy the arm 6 and thus a jaw 2, 4 that the arm bears at its distal end 8, outside the sheath 7 and thus to separate said jaw 2, 4 from the surface of the dashboard 24, typically during the placement of a device 20 in the support 1, or on the contrary to bring the arm 6 back into the sheath 7 and thus to retract it into the dashboard 24, for storage of the support 1 when it is not receiving a device 20.

Relative to the translational movement of the arm 6 with respect to the sheath 7, it is possible to define a proximal end, or deepest end of the arm 6 in the sheath 7, and a distal end 8, or protruding end, at the other end of the arm 6. The arm 6 bears, at its distal end 8, one of the two jaws 2, 4, for example the second jaw 4.

Such an arrangement, comprising two opposite jaws 2, 4, a sheath 7 stationary relative to one of the two jaws 2, 4, for instance the first jaw 2, an arm 6 able to translate relative to the sheath 7 and bearing the other of the two jaws 2, 4, for instance the second jaw 4, makes it possible to move one of the jaws 4 relative to the other 2 and thus to adjust an opening able to receive a device 30 by two of its opposite edges 31, 32, between the two jaws 2, 4.

This is true if the main extension direction of the sheath 7, which is combined with the main extension direction 13 of the arm 6, is not secant with the receiving axis 3. This condition is assumed to be met by the support 1.

The dimension amplitude of a device 30 that a support 1 can accommodate is determined by its opening or distance between the two jaws 2, 4. This amplitude is determined by the position 12 of the arm 6 outside the sheath 7.

The opening is proportionately conditioned by the deployment length 12 of the arm 6 outside the sheath 7. Yet this length 12 is greatly limited by the integration constraints related to the available space in the structure receiving the support 1, such as a dashboard 24. As a result of this arrangement, the incline of the device 30 depends on its dimension. Thus, a "small" device 30, having a smaller dimension, requires a small separation of the jaws 2, 4. This results in a first incline of the device 30. Conversely, a "large" device 30, having a larger dimension, requires a greater separation of the jaws 2, 4. This results in an incline of the device 30 different from the previous one. The incline follows directly from the dimension, and is thus detrimentally not variable.

Consequently, if the support 1 only has the degree of translational freedom of the arm 6 relative to the sheath 7, the opening of the support 1 detrimentally conditions the incline of the received device 20.

In order to resolve this drawback, the support 1 comprises a second degree of freedom. This second degree of freedom is obtained in that the arm 6 comprises two segments 10, 11, articulated relative to one another by a rotation axis 9. The proximal segment 10 is the deepest segment in the sheath 7, and the distal segment 11 is the segment first leaving the sheath 7 and bearing one of the jaws 4 at its distal end 8. The rotation axis 9 is secant to the main elongation direction 13 of the arm 6.

A first return means tends to rotate the distal segment 11 relative to the proximal segment 10, in the direction bringing the second jaw 4 closer to the first jaw 2.

The first return means can be any means able to exert a return force between the first segment 10 and the second segment 11 of the arm 6. It may comprise an active means of the controlled actuator type, such as a motor or a jack (electric, pneumatic or hydraulic). Preferably, it may comprise a passive means, such as a gravitational means of in form of a counterweight, or a resilient means, if applicable acting via a return mechanism comprising a pulley, cable, lever, etc. A resilient means may be based on the compression of a gas (gas cylinder), the compression or traction of a resilient material, such as an elastomer, a plastic or metal, for example to form a spring. Such a spring may advantageously be a torsion spring.

The sheath 7 performs another function inasmuch as it prohibits any rotation around the rotation axis 9 as long as the rotation axis 9 is in the sheath 7. This is for example done using a sheath 7 enveloping the segments 10, 11, at least in certain directions, so as to oppose the rotational movement. Thus, as long as the rotation axis 9 is in the sheath 7, the two segments 10, 11 are necessarily substantially aligned, along the main extension direction 13 of the arm 6, and rotation around the rotation axis 9 is made impossible.

Following a translational movement of the arm 6 outside the sheath 7, at least until the distal segment 11 is completely deployed outside the sheath 7 and the rotation axis 9 is outside the sheath 7, the rotation 9 once again becomes possible.

A second return means (not shown) may be positioned so as to assist with a movement of the arm 6 relative to the sheath 7.

The second return means can be any means able to exert a return force between the arm 6 and the sheath 7. It may comprise an active means of the controlled actuator type, such as a motor or a jack (electric, pneumatic or hydraulic). Preferably, it may comprise a passive means, such as a gravitational means of in form of a counterweight, or a resilient means, if applicable acting via a return mechanism comprising a pulley, cable, lever, etc. A resilient means may be based on the compression of a gas (gas cylinder), the compression or traction of a resilient material, such as an elastomer, a plastic or metal, for example to form a spring. Such a spring may be a traction spring, or a compression spring, depending on its arrangement and the direction in which it acts.

Under the action of the first return means, the rotation 9 is even assisted and performed if nothing opposes the action of the first return means.

The translation of the arm 6 relative to the sheath 7 advantageously has two purposes. The first advantage lies in providing an arm 6, which is short when it is not in use, thus limiting the space that it takes up in the receiving structure of the support 1, for example a dashboard 24, and advantageously facilitating its integration, and which may be long, in order to increase the opening of the support 1, when a large device 30 is received in the support 1. A second advantage lies in providing a first degree of freedom.

The additional degree of freedom, provided by the rotation around the axis 9, makes it possible, once the rotation axis 9 is outside the sheath 7, to rotate the distal segment 11 relative to the sheath 7 and thus relative to the dashboard 24, making it possible to significantly increase the opening of the support 1 by offering a significant separation of the two jaws 2, 4, in a small overall bulk, thus making integration into the dashboard 24 easier.

This also makes it possible to vary the incline of the device 30 independently from its size. This advantageously makes it possible to configure the incline of the device 30, independently from the size of the device 30, so as typically to give it value offering a comfortable viewing angle for the user.

The presence of the first return means, which tends to bring the two jaws 2, 4 closer together and to provide a force in that sense, also provides pressure of the jaws 2, 4 on the device 20 and thus its maintenance in the support 1, like a clamp.

It has been seen that the first receiving axis 3 and the second receiving axis 5 are substantially parallel. As a result, the two jaws 2, 4 are substantially aligned. This is related to the parallelism of the two opposite edges 31, 32 of the device 30.

The orientation of the rotation axis 9 may be defined in any way relative to the shared direction of the two receiving axes 3, 5. A perpendicular configuration should nevertheless be avoided, since it eliminates the advantage provided by the second degree of freedom.

One particular orientation of the rotation axis 9 relative to the shared direction of the two receiving axes 3, 5 is that illustrated in FIGS. 1-3, where the rotation axis 9 is substantially parallel to the first receiving axis 3 and the second receiving axis 5. Such an arrangement is advantageous inasmuch as it guarantees a parallelism of the two receiving faces 3, 5, and therefore of the two jaws 2, 4, during the rotation of the two segments 10, 11.

Likewise, the orientation of the direction of the rotation axis 9 may be defined in any way relative to the main elongation direction 13 of the arm 6. An aligned or perpendicular configuration should nevertheless be avoided, since it eliminates the advantages provided by the translation.

One particular orientation of the rotation axis 9 relative to the main elongation direction 13 of the arm 6 is that illustrated in FIGS. 1-5, where the rotation axis 9 is substantially perpendicular to the main elongation direction 13.

Advantageously, if the two preceding features are applied jointly, the shared direction of the two receiving axes 3, 5 is parallel to the rotation axis 9, as shown in FIGS. 1-5.

It has been seen that modifying the position 12 of the arm 6, which is possible owing to the translation, makes it possible to adjust the support 1. In order to block the configuration of the support 1 in the obtained adjustment, the arm 6 also advantageously comprises a locking means (not shown) able to immobilize the arm 6.

At minimum, this locking means is able to immobilize the arm 6 in each of the two extreme positions: in the minimum elongation position, where the arm 6 is maximally brought into the sheath 7, and the maximum elongation position, where the arm 6 is maximally deployed.

Advantageously, this locking means is able to perform said immobilization substantially at any achievable position 12, or in any position 12 comprised between the minimum elongation, where the arm 6 is brought maximally into the sheath 7, and a maximum elongation, where the arm 6 is maximally deployed.

Such a locking means can be produced by any mechanism imaginable by one skilled in the art. As an illustration, one such locking means may comprise a rack, secured to the arm 6, and a needle, secured to the sheath 7, selectively engageable or disengageable in the teeth of said rack. When the needle is engaged in the rack, the translation of the arm relative to the sheath 7 is impossible, thus producing the desired locking. Such a rack defines, based on its pitch, discrete locking positions. During locking, the needle engages a tooth of the rack. This tooth is most often situated immediately before or immediately after the position of the needle. The term "substantially" used for the feature "in any achievable elongation 12" relates to this discretization of the possible locking positions. The pitch of the rack is adopted based on a desired "resolution" of the locking position.

The locking means further advantageously comprises a third return means (not shown) tending to actuate the locking means, or to place it in the locked configuration. Such a return means ensures that, by default, the locking means is locked, preventing the translation. In the example embodiment previously described, comprising a rack and a needle, the third return means acts so as to engage the needle in the rack.

In order to allow the translation, the locking means further advantageously comprises an inhibiting means (not shown). This inhibiting means is able to inhibit the locking means, or to place it in an unlocked configuration, when the inhibiting means is activated. In the preceding exemplary embodiment, an inhibiting means typically comprises a device acting so as to disengage the needle. The locking means further advantageously comprises a maneuvering member 14 making it possible to activate the inhibiting means. Maneuvering the maneuvering member 14 thus activates the inhibiting means, which in turn unlocks the locking means, thus allowing the translation.

The two preceding features may advantageously be combined. In this case, the inhibiting means typically opposes the third return means. When the maneuvering member 14 is actuated, the inhibiting means is activated, the locking means is unlocked, and the translation is possible, allowing an adjustment of the position 12. When the maneuvering member 14 is released, the third return means can act, the inhibiting means is deactivated, the locking means is locked, and the translation is preventing, preserving the adjustment of the position 12.

The maneuvering member 14 can be arranged in any location, for example on the dashboard 24, as long as it is accessible to a user. However, as shown in FIGS. 1-3, the maneuvering member 14 is advantageously arranged at the distal end 8 of the distal segment 11 of the arm 6. Such an arrangement advantageously allows a user to grasp the distal end 8, in order to apply a force on the arm 6 in the main extension direction 13, either one way, by pulling, or the other way, by pushing, seeking to modify the position 12, and at the same time actuating the maneuvering member 14, so as to unlock the locking means beforehand. When, at the end of the modification of the elongation 12, the desired position is reached, the user stops actuating the maneuvering member 14 and the third return means provides locking, substantially in the current position.

The second return means (not shown) facilitates the translation and the preceding adjustment operation for the position 12 of the arm 6. This second return means is able to provide, in the form of a force, assistance for the translation of the arm 6 relative to the shaft 7.

Here, two substantially equivalent configurations are possible. According to a first configuration, the second return means is configured so as to cause the arm 6 to reenter the sheath 7. In this configuration, the return means is typically a traction means, such as a rubber band or an extension spring, for example arranged between the arm 6 and the sheath 7. In this configuration, the user adjusting the elongation 12 acts either by opposing the second return means, pulling on the distal end 8 to elongate the arm 6, or by allowing the second return means to act to shorten the arm 6.

According to a second preferred configuration, the second return means is configured so as to cause the arm 6 to leave the sheath 7. In this configuration, the return means is typically a compression means, such as a compression spring or a gas cylinder, for example arranged between the arm 6 and the sheath 7. In this configuration, the user adjusting the elongation 12 acts either by opposing the second return means, pushing on the distal end 8 to shorten the arm 6, or by allowing the second return means to act to elongate the arm 6.

During the placement, removal, respectively, of a device 30 in/from the support 1, once the rotation axis 9 is outside the sheath 7, the user can use the action of the first return means to rotate the distal segment 11, either by allowing the first return means to act to bring the jaws 2, 4 closer together, or by opposing the first return means to separate the two jaws 2, 4.

It has been seen that a jaw 2, 4 extends primarily along a receiving direction or axis 3, 5. The exact shape of a jaw 2, 4 is determined, in negative, by the shape of the devices 30 that the support 1 must be able to receive. An arrangement at the center of the jaw 2, 4 may be suitable for receiving older generation cellular telephones, which have more complex dimensions, but most often are less expansive along the receiving axis 3, 5. More recent cellular telephones (smartphones), as well as tablets or phablets, most often have a substantially rectilinear edge 31, 32 and a greater extension along the receiving axis 3, 5. Consequently, a jaw 2, 4 advantageously has a substantially rectilinear shape, preferably rectangular, primarily outside a central zone.

According to one advantageous feature, a jaw 2, 4 advantageously comprises at least one cavity, advantageously oriented toward the device 30. This is illustrated, in FIGS. 1-3, in a more pronounced manner for the first jaw 2, here arranged in the lower position, and to a lesser extent for the second jaw 4, the profile of which is also configured to be hollow. The main function of such a cavity is to have walls, substantially parallel to the receiving axis 3, 5, that are arranged on either side of the device 30, so as to oppose the movement of the device 30 along a direction transverse the receiving axis 3, 5, one way or the other.

Such a function may also be performed by at least one protuberance, preferably two protuberances arranged parallel to the receiving axis 3, 5, so as to be arranged on either side of the device 30.

The presence of several cavities or protuberances advantageously makes it possible to have several placement positions for the smartphone in order to vary its orientation and/or accommodate different smart phone sizes.

Such a function may also be performed, in combination with one of the two preceding functions, or even alone, with a flat jaw 2, 4 (without cavity, without protuberance), using a compliant material, such as elastomeric foam, arranged in the contact zone with the edge 31, 32 of the received device 30 and advantageously compressed by said edge 31, 32.

The invention also relates to a dashboard 24 comprising such a support 1, as shown in FIGS. 1-3. According to one preferred integration mode, a dashboard 24 receives a support 1 as follows. The first jaw 2 is stationary relative to the dashboard 24. It may even be made directly in the dashboard, for example integrally. The sheath 7 is also stationary relative to the dashboard 24, and arranged such that the arm 6 and the second jaw 4 face the first jaw 2 and are parallel thereto.

According to another preferred embodiment, the receiving axis 3 defining the first jaw 2 is horizontal, still more preferably aligned with the transverse axis, Y axis in automobile notation, of the dashboard 24.

According to still another preferred embodiment, the first jaw 2 is on bottom, in the lower position, facing up and the arm 6 is arranged on top, in the upper position, the second jaw 4 facing downward, as illustrated in FIGS. 1-3.

Also advantageously, the support 1 may be arranged in front of a recess, formed or pre-existing, of the dashboard 24, so as to allow greater placement latitude for the device 30.

As it is designed and in the described preferred configuration, the support 1 is easily placed in the upper part of the dashboard 24.

When no device 30 is received and the support 1 is unused, the arm 6 is advantageously brought or retracted in the sheath 7, and its elongation 12 is minimal.

According to another feature, the sheath 7 is arranged, substantially flush with the dashboard 24, such that at least part of the distal end 8 of the arm 6 remains protruding relative to the dashboard 24, including in the retracted position. This feature, more particularly illustrated in FIG. 1, showing an unused and retracted support 1, allows a user to grasp, typically by a thumb/finger pinch, the distal end 8 of the arm 6 so as to maneuver it to adjust its position/elongation 12.

If the distal end 8 of the arm 6 includes a maneuvering member 14, the latter is advantageously arranged in the protruding part, so as to be able to be maneuvered, at the same time as the grasping.

Advantageously, the support 1 as described in its preferred embodiment allows a user to achieve an elongation configuration 12 of the arm 6 with a single hand, or even two fingers. This is advantageous inasmuch as the placement or removal operation may be carried out by manipulating the support 1 with one hand, and manipulating the device 30 with the other hand. Advantageously, it is even possible to manipulate the support 1 and the device 30, for a placement or removal operation, with a single hand.

Also advantageously, the support 1 is further able to leave at least a front panel 33 of the device 30 visible and accessible, so that the device can continue to be used. The fact that the first return means provides tightening of the two jaws 2, 4 guarantees maintenance of the device 30 allowing it to withstand a force, such as bearing on its front panel/touchscreen, making it possible to control the device 1.

The invention claimed is:

1. A support for a device, with a parallelepiped shape, such as a smartphone, comprising:
    a first jaw extending primarily along a receiving axis and able to receive a first edge of the device, and
    a second jaw, extending primarily along a second receiving axis parallel to the first receiving axis, able to receive a second edge of the device opposite the first edge, and facing the first jaw,
    wherein the support further comprises a sheath, an arm and a first return means, the sheath being stationary relative to the first jaw, and the arm being able to translate relative to the sheath, along a main elongation direction of the arm, and
    wherein the arm comprises a proximal segment and a distal segment, articulated to one another via a rotation axis secant to a primary elongation direction of the arm, the distal segment bearing the second jaw at its distal end, and the first return means tending to rotate the distal segment relative to the proximal segment, in the direction bringing the second jaw closer to the first jaw.

2. The support according to claim 1, wherein it further comprises a second return means, tending to move the arm in the sheath where the second return means is configured so as to cause the arm to leave the sheath.

3. The support according to claim 1, wherein the rotation axis is perpendicular to the main elongation direction.

4. The support according to claim 1, wherein the rotation axis is parallel to the first receiving axis.

5. The support according to claim 1, wherein it further comprises a locking means, able to immobilize the arm relative to the sheath, substantially in any achievable position.

6. A dashboard comprising a support according to claim 1, where the first jaw is stationary relative to the dashboard, is horizontal, and is aligned with a transverse axis of the dashboard, and where the rotation axis is horizontal and is aligned with the transverse axis of the dashboard.

7. The dashboard according to claim 6, wherein the arm is configured and arranged such that, when retracted, at least part of the distal end protrudes relative to the dashboard, so as to allow grasping and maneuvering.

8. A vehicle comprising a support according to claim 1.

9. A vehicle comprising a dashboard according to claim 6.

10. A support for a device, with a parallelepiped shape, such as a smartphone, comprising:
    a first jaw extending primarily along a receiving axis and able to receive a first edge of the device, and
    a second jaw, extending primarily along a second receiving axis parallel to the first receiving axis, able to receive a second edge of the device opposite the first edge, and facing the first jaw,
    wherein the support further comprises a sheath, an arm and a first return means, the sheath being stationary relative to the first jaw, and the arm being able to translate relative to the sheath, along a main elongation direction of the arm, wherein the arm comprises a proximal segment and a distal segment, articulated to one another via a rotation axis secant to a primary elongation direction of the arm, the distal segment bearing the second jaw at its distal end, and the first return means tending to rotate the distal segment relative to the proximal segment, in the direction bringing the second jaw closer to the first jaw, and wherein the sheath prohibits any rotation around the rotation axis as long as the rotation axis is in the sheath.

11. A dashboard, comprising:

a support for a device, with a parallelepiped shape, such as a smartphone, the support including:
- a first jaw extending primarily along a receiving axis and able to receive a first edge of the device, and
- a second jaw, extending primarily along a second receiving axis parallel to the first receiving axis, able to receive a second edge of the device opposite the first edge, and facing the first jaw, wherein the support further comprises a sheath, an arm and a first return means, the sheath being stationary relative to the first jaw, and the arm being able to translate relative to the sheath, along a main elongation direction of the arm, and wherein the arm comprises a proximal segment and a distal segment, articulated to one another via a rotation axis secant to a primary elongation direction of the arm, the distal segment bearing the second jaw at its distal end, and the first return means tending to rotate the distal segment relative to the proximal segment, in the direction bringing the second jaw closer to the first jaw, wherein the first jaw is stationary relative to the dashboard, is horizontal, and is aligned with a transverse axis of the dashboard, and where the rotation axis is horizontal and is aligned with the transverse axis of the dashboard, and wherein the sheath is flush with the dashboard, so that the arm is retractable into the dashboard.

* * * * *